US012794177B2

(12) United States Patent
Wu et al.

(10) Patent No.: US 12,794,177 B2
(45) Date of Patent: Nov. 10, 2026

(54) HOUSING ASSEMBLY FOR ELECTRICAL CONNECTOR

(71) Applicants: Tyco Electronics (Suzhou) Ltd., Suzhou City (CN); Tyco Electronics Technology (SIP) Ltd., Suzhou (CN); Tyco Electronics (Shanghai) Co., Ltd., Shanghai (CN)

(72) Inventors: Zhuangzhi (Bill) Wu, Suzhou (CN); Kaixuan (Evan) Jiang, Shanghai (CN); Jun Zong, Shanghai (CN); Yihao Tang, Suzhou (CN)

(73) Assignees: Tyco Electronics (Suzhou) Ltd., Suzhou City (CN); Tyco Electronics Technology (SIP) Ltd., Suzhou (CN); Tyco Electronics (Shanghai) Co., Ltd., Shanghai (CN)

( * ) Notice: Subject to any disclaimer, the term of this patent is extended or adjusted under 35 U.S.C. 154(b) by 324 days.

(21) Appl. No.: 18/485,354

(22) Filed: Oct. 12, 2023

(65) Prior Publication Data

US 2024/0128684 A1 Apr. 18, 2024

(30) Foreign Application Priority Data

Oct. 12, 2022 (CN) ........................ 202222689288.0

(51) Int. Cl.
*H01R 13/629* (2006.01)

(52) U.S. Cl.
CPC . *H01R 13/62955* (2013.01); *H01R 13/62938* (2013.01)

(58) Field of Classification Search
CPC ........ H01R 13/62955; H01R 13/62938; H01R 13/703; H01R 13/707
USPC .......................................................... 439/372
See application file for complete search history.

(56) References Cited

U.S. PATENT DOCUMENTS

| | | | | |
|---|---|---|---|---|
| 8,641,433 B2 * | 2/2014 | Uchida | H01R 13/62955 | 439/372 |
| 2006/0281351 A1 * | 12/2006 | Yamaoka | H01R 13/62938 | 439/157 |
| 2017/0133790 A1 * | 5/2017 | Yamane | H01R 13/703 | |
| 2019/0109401 A1 * | 4/2019 | Yamane | H01R 13/641 | |
| 2021/0013674 A1 * | 1/2021 | Akagi | H01R 13/62955 | |

* cited by examiner

*Primary Examiner* — Tulsidas C Patel
*Assistant Examiner* — Thaslimur Rahman
(74) *Attorney, Agent, or Firm* — Barley Snyder

(57) ABSTRACT

A housing assembly for electrical connector includes a housing body and a locking lever pivotally connected to the housing body. The locking lever is pivotable relative to the housing body between a pre-locked position and a locked position. A groove is formed in an outer side surface of the housing body, and an elastic protrusion is formed on an inner side surface of the locking lever. The groove and the elastic protrusion are adapted such that the elastic protrusion is engaged into the groove when the locking lever is in the pre-locked position, and the elastic protrusion is disengaged from the groove when the locking lever is moved from the pre-locked position.

20 Claims, 6 Drawing Sheets

HOUSING ASSEMBLY FOR ELECTRICAL CONNECTOR

CROSS-REFERENCE TO RELATED APPLICATION

This application claims the benefit of Chinese Patent Application No. CN 202222689288.0 filed on Oct. 12, 2022, in the China National Intellectual Property Administration, the whole disclosure of which is incorporated herein by reference.

FIELD OF THE INVENTION

Embodiments of the present disclosure generally relate to a technical field of electrical connectors, and specifically, to a housing assembly for an electrical connector.

BACKGROUND

In the related art, regarding electrical connectors with built-in locking levers, the locking lever is typically pivotally connected to a connector housing and can pivot relative to the connector housing between a pre-locked position and a locked position. In order to ensure that the locking lever can be pivoted and positioned effectively between the pre-locked position and the locked position, a lug structure is usually provided on an outer side surface of the connector housing and extends outwardly from the outer side surface. A pivot action of the locking lever is constrained in a single direction by providing the lug structure on a pivoting path of the locking lever. However, in practice, this lug structure can only constrain the pivot action of the locking lever in the single direction and cannot achieve stable positioning of the locking lever. Thus, there is a risk of unwanted pivot action of the locking lever. In addition, this lug structure increases the size of the connector housing, which does not facilitate the miniaturization of the connector housing.

SUMMARY

According to an embodiment of the present disclosure, a housing assembly for electrical connector includes a housing body and a locking lever pivotally connected to the housing body. The locking lever is pivotable relative to the housing body between a pre-locked position and a locked position. A groove is formed in an outer side surface of the housing body, and an elastic protrusion is formed on an inner side surface of the locking lever. The groove and the elastic protrusion are adapted such that the elastic protrusion is engaged into the groove when the locking lever is in the pre-locked position, and the elastic protrusion is disengaged from the groove when the locking lever is moved from the pre-locked position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
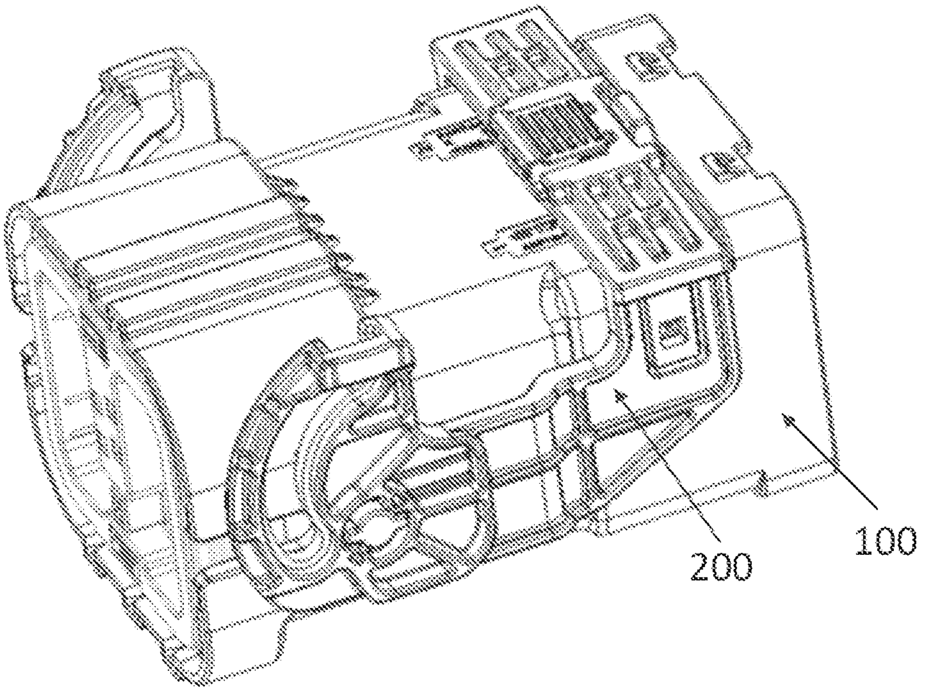
FIG. 1 is a schematic structural view of a housing assembly for electrical connector according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A housing assembly for electrical connector according to an embodiment of the present disclosure includes a housing body and a locking lever. The locking lever is pivotally connected to the housing body and is adapted to pivot relative to the housing body between a pre-locked position and a locked position. A groove is formed in an outer side surface of the housing body, and an elastic protrusion is formed in an inner side surface of the locking lever. The groove and the elastic protrusion are adapted (e.g., sized and located) such that the elastic protrusion is engaged into or with the groove when the locking lever is in the pre-locked position, and the elastic protrusion is disengaged from the groove when the locking lever leaves the pre-locked position.

Figure 2:
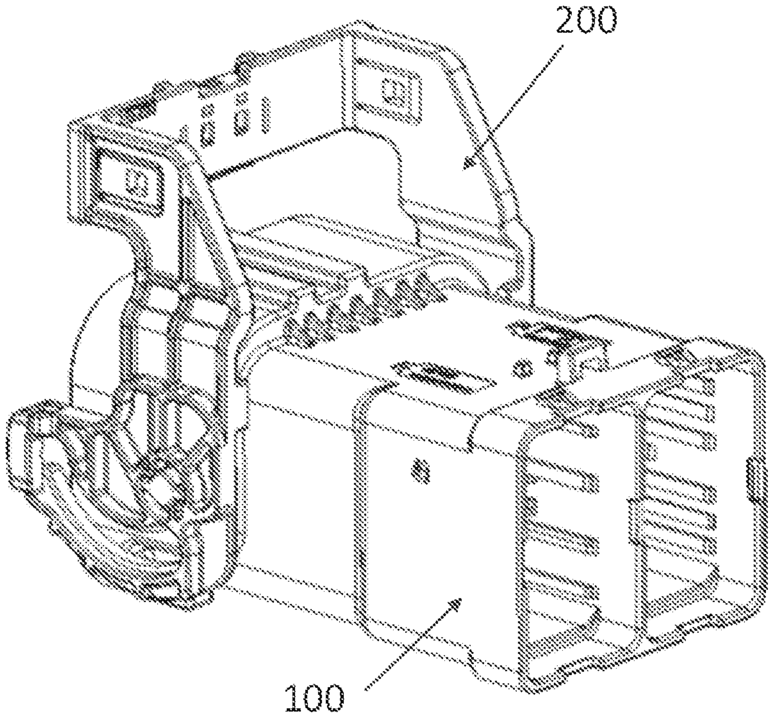
FIG. 2 is another schematic structural view of the housing assembly for electrical connector according to an exemplary embodiment of the present disclosure.
Figure 3:
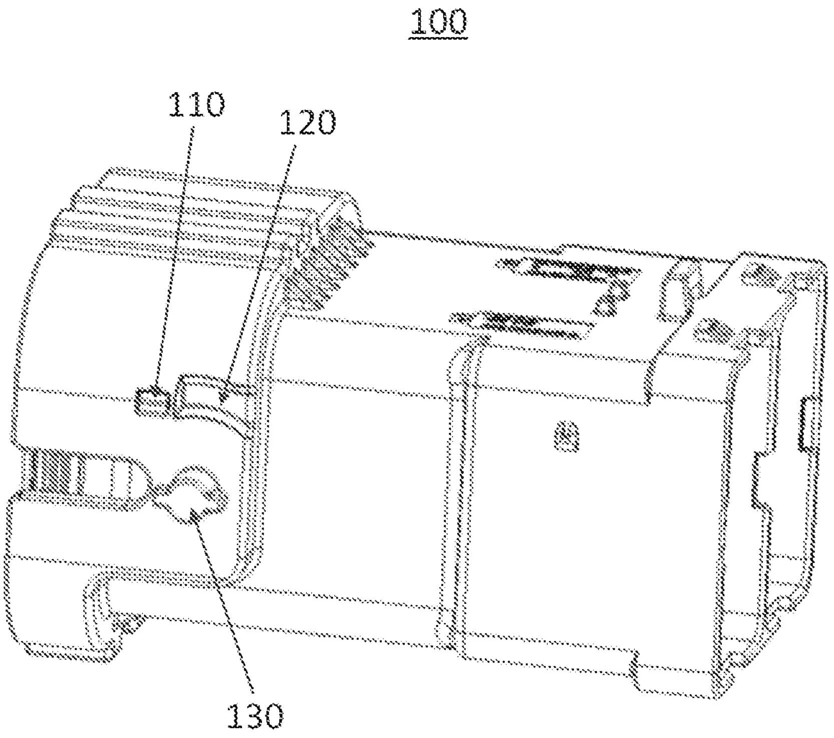
FIG. 3 is a schematic structural view of a housing body of the housing assembly for electrical connector according to an exemplary embodiment of the present disclosure.
Figure 4:
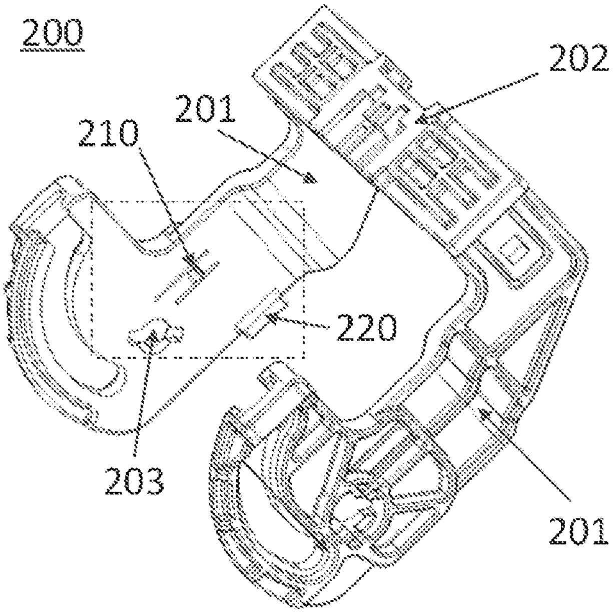
FIG. 4 is a schematic structural view of a locking lever of the housing assembly for electrical connector according to an exemplary embodiment of the present disclosure.
Figure 5:
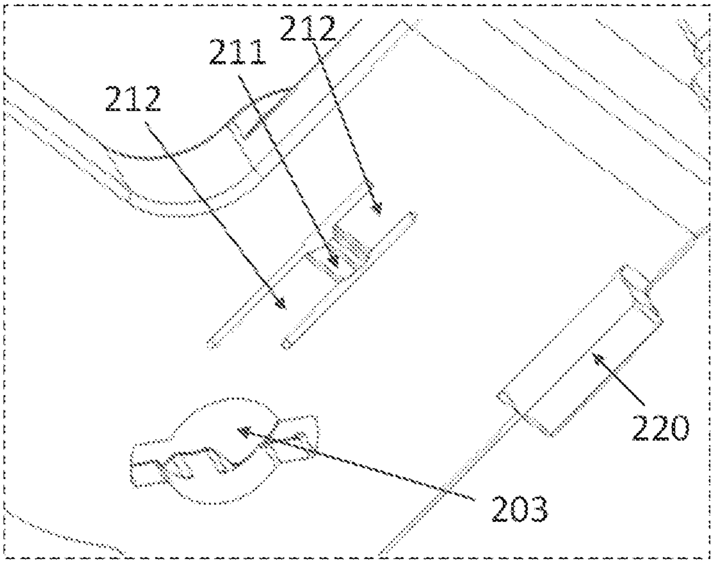
FIG. 5 is a schematic enlarged view at the dashed box in FIG. 4.
Figure 6:
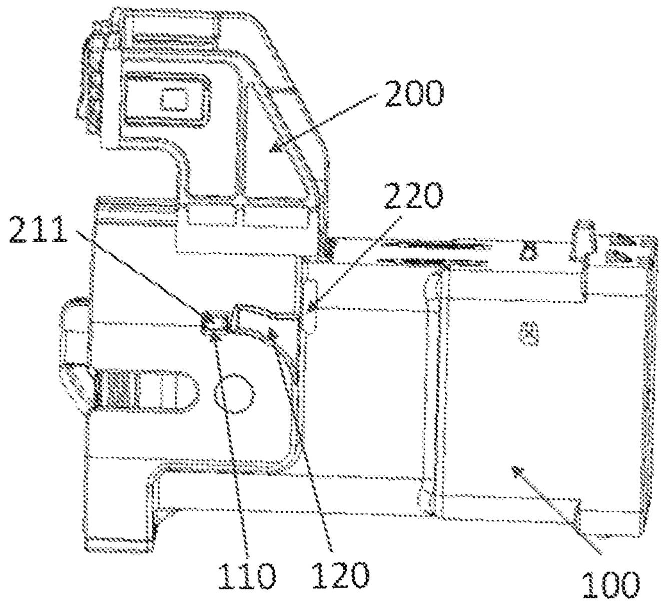
FIG. 6 is a partial structural view of the housing assembly for electrical connector according to an exemplary embodiment of the present disclosure.
Figure 7:
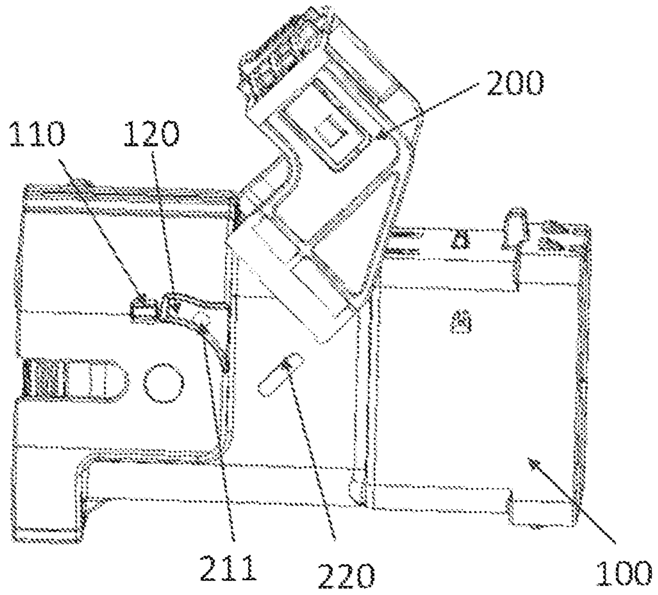
FIG. 7 is another partial structural view of the housing assembly for electrical connector according to an exemplary embodiment of the present disclosure.
Figure 8:
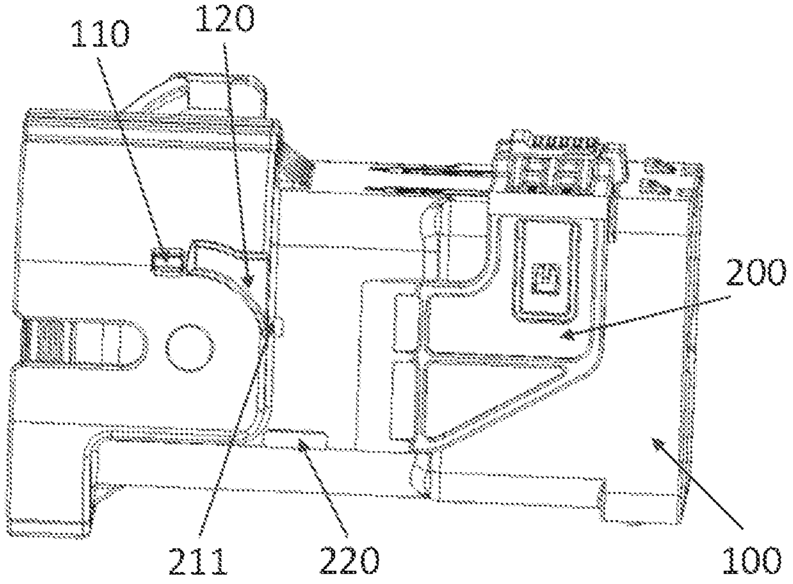
FIG. 8 is another partial structural view of the housing assembly for electrical connector according to an exemplary embodiment of the present disclosure.

FIGS. 1 and 2 are distinct schematic structural views of a housing assembly for electrical connector according to exemplary embodiments of the present disclosure. FIG. 1 shows a locking lever 200 in a pre-locked position relative to a housing body 100, and FIG. 2 shows the locking lever 200 in a locked position relative to the housing body 100. FIG. 3 is a schematic structural view of a housing body of the housing assembly for electrical connector according to an exemplary embodiment of the present disclosure and shows a groove 110 and a sliding groove 120 provided in the outer side surface of the housing body 100. FIG. 4 is a schematic structural view of the locking lever of the housing assembly for electrical connector according to an exemplary embodiment of the present disclosure and shows an elastic protrusion 210 and an error-proofing stopper 220 provided on the inner side surface of the locking lever 200. FIG. 5 is a schematic enlarged view at the dashed box in FIG. 4 and shows a specific structure of the elastic protrusion 210. FIGS. 6-8 are partial schematic structural views of the housing assembly for electrical connector according to an exemplary embodiment of the present disclosure. For clarity, a portion of an arm portion of the locking lever 200 facing out of the paper is omitted in FIGS. 6-8 to show a movement direction or trajectory of a boss 211 of the elastic protrusion (to be described in detail below) and the error-proofing stopper 220. FIG. 6 shows the locking lever 200 in the pre-locked position. FIG. 7 shows the locking lever 200 in the process of pivoting from the pre-locked position to the locked position. FIG. 8 shows the locking lever 200 in the locked position.

According to the exemplary embodiments of the present disclosure, as shown in FIGS. 1-8, a housing assembly for electrical connector is provided. The housing assembly includes a housing body 100 and a locking lever 200. The housing body 100 has at least two ports and is adapted to house connection terminals for electrical connection in the housing body 100. The locking lever 200 is used to lock a connector including the housing body 100, to a mating connector that matches the connector. The locking lever 200 may be pivotally connected to the housing body 100, for example, by the pivot fitting relationship formed between a pivot shaft 130 (as shown in FIG. 3) formed on the housing body 100 and a pivot shaft hole 203 (as shown in FIG. 4) formed in the locking lever 200. The locking lever 200 is adapted to pivot relative to the housing body 100 between a pre-locked position (as shown in FIG. 2) and a locked position (as shown in FIG. 1). According to the exemplary embodiments of the present disclosure, a groove 110 is formed in the outer side surface of the housing body 100, and an elastic protrusion 210 is formed on the inner side surface of the locking lever 200. The groove 110 and the elastic protrusion 210 are configured such that the elastic protrusion 210 is engaged into the groove 110 when the locking lever 200 is in the pre-locked position, as shown in FIG. 6. The groove 110 and the elastic protrusion 210 are further configured such that the elastic protrusion 210 is disengaged from the groove 110 when the locking lever 200 leaves the pre-locked position, as shown in FIGS. 7 and 8. The locking lever can be stably locked in its pre-locked position by the engagement between the elastic protrusion formed on the locking lever and the groove formed in the housing body due to the aforementioned configuration, and when the locking lever needs to be pivoted to the locked position, only a small force needs to be applied to enable the locking lever to smoothly leave the pre-locked position, thus providing stable locking in the pre-locked position of the locking lever. In addition, in the housing assembly provided by the present disclosure, it is only required that the groove is formed in the outer side surface of the housing body, which can also reduce the size of the housing body and facilitate the miniaturization of the housing assembly.

According to the exemplary embodiment of the present disclosure, as shown in FIGS. 3 and 6-8, a sliding groove 120 is also formed in the outer side surface of the housing body 100. Specifically, the sliding groove 120 is located adjacent to the groove 110. The sliding groove 120 is configured such that, as the locking lever 200 pivots from the pre-locked position shown in FIG. 6 to the locked position shown in FIG. 8, the boss 211 (which will be described in detail later) of the elastic protrusion disengaged from the groove 110 enters into the sliding groove 120 and travels there along.

According to the exemplary embodiment of the present disclosure, as shown in FIGS. 4 and 5, the elastic protrusion 210 may further include an elastic sheet 212 and the boss 211. Specifically, the elastic sheet 212 extends from the inner side surface of the locking lever 200, and the boss 211 extends and protrudes from the elastic sheet 212. In the illustrated exemplary embodiment, two opposite ends of the elastic sheet 212 extend from the inner side surface of the locking lever 200, respectively. Two sides of the elastic sheet 212 adjacent to the two opposite ends are separated from the inner side surface of the locking lever 200, and the boss 211 is located approximately in the middle of the elastic sheet 212. In addition, the boss 211 may be formed by bending the elastic sheet 212. In other embodiments, in order to achieve the elastic locking, the locking lever 200 may adopt other suitable structures. By way of example, only one end of the elastic sheet 212 extends from the inner side surface of the locking lever 200, by way of another example, the boss 211 is located at a free end of the elastic sheet 212, and so on. Preferably, the elastic protrusion 210 is integrally formed with the inner side surface of the locking lever 200, but the present disclosure is not limited to this embodiment.

According to the exemplary embodiment of the present disclosure, as shown in FIGS. 4 and 5, a wall surface of the groove 110 near the sliding groove 120 is formed with a chamfer, and the boss 211 has an inclined face that matches the chamfer. In this way, the boss 211 of the locking lever 200 is enabled to slide smoothly into or out of the groove 110 formed in the housing body 100 by the fitting between the chamfer and the inclined face. Furthermore, a wall surface of the sliding groove 120 near the groove 110 is formed with a chamfer. This enables the boss 211 to disengaged from the groove 110 to slide smoothly into or out of the sliding groove 120 formed in the housing body 100. It is also possible to provide a better feel of the operation of the locking lever by the aforementioned configuration.

According to the exemplary embodiment of the present disclosure, as shown in FIG. 4, the locking lever 200 further includes a pair of arm portions 201 and a connecting portion 202. The connecting portion 202 is connected to the pair of arm portions 201. The pair of arm portions 201 is pivotally connected to the opposite outer side surfaces of the housing body 100, respectively. The elastic protrusion 210 is formed on the inner side surface of each arm portion 201 of the pair of arm portions 201, and the groove 110 and the sliding groove 120 are correspondingly formed in each outer side surface of the opposite outer side surfaces of the housing body 100.

As shown in FIGS. 4 to 8, the locking lever 200 is formed with an error-proofing stopper 220. The error-proofing stopper 220 is adapted to prevent the locking lever 200 from being pivoted from the pre-locked position in a direction opposite to the locked position, thereby avoiding excessive free pivoting of the locking lever 200. Specifically, the error-proofing stopper 220 extends from each arm portion 201 of the pair of arm portions 201 towards the outer side surface of the housing body 200. In this way, it can be abutted against a step of a rear end of the port of the housing body 100 when the locking lever 200 is in the pre-locked position, to prevent excessive free pivoting of the locking lever 200.

In the connector housing of the forgoing various exemplary embodiments of the present disclosure, the locking lever can be stably locked in its pre-locked position by the engagement between the elastic protrusion formed on the locking lever and the groove formed in the housing body. When the locking lever needs to be pivoted into the locked position, only a small force needs to be applied to enable the locking lever to smoothly leave the pre-locked position. In this way, a stable locking in the pre-locked position of the locking lever is provided. In addition, in the housing assembly according to the forgoing various exemplary embodiments of the present disclosure, it is only required that the groove is formed in the outer side surface of the housing body. This can reduce the size of the housing body and facilitate the miniaturization of the housing assembly. In addition, the housing assembly according to the forgoing various exemplary embodiments of the present disclosure can also provide a better feel of the operation of the locking lever.

The housing assembly for electrical connector provided by the exemplary embodiment of the present disclosure may be used as an outer housing of an electrical connector for electrical connection to a battery of a new energy vehicle so as to charge the battery.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A housing assembly for an electrical connector, comprising:

a housing body including a groove formed in an outer side surface thereof; and a locking lever pivotally connected to the housing body and pivotable relative to the housing body between a pre-locked position and a locked position, the locking lever including:

an elastic protrusion formed on an inner side surface thereof, the groove and the elastic protrusion are adapted such that the elastic protrusion is engaged into the groove when the locking lever is in the pre-locked position, and the elastic protrusion is disengaged from the groove when the locking lever is moved from the pre-locked position; and an error-proofing stopper preventing the locking lever from being pivoted from the pre-locked position in a direction opposite to the locked position, the error-proofing stopper abutting a rear-facing surface of the housing body with the locking lever in the pre-locked position, the rear-facing surface facing opposite an open end of a port of the housing.

2. The housing assembly according to claim 1, wherein the error-proofing stopper extends from each arm portion of the pair of arm portions towards the outer side surface of the housing body.

3. The housing assembly according to claim 1, wherein the housing assembly is an outer housing of an electrical connector adapted to electrically connect to a battery of a vehicle.

4. The housing assembly according to claim 1, further comprising a sliding groove formed in the outer side surface of the housing body and located adjacent to the groove, the sliding groove adapted such that as the locking lever is pivoted from the pre-locked position to the locked position, the elastic protrusion disengaged from the groove enters into and is moved along the sliding groove.

5. The housing assembly according to claim 4, wherein the elastic protrusion further comprises:

an elastic sheet extending from the inner side surface of the locking lever; and a boss protruding from the elastic sheet.

6. The housing assembly according to claim 5, wherein the boss is defined by a bend formed in the elastic sheet.

7. The housing assembly according to claim 5, wherein the elastic protrusion is integrally formed with the inner side surface of the locking lever.

8. The housing assembly according to claim 5, wherein two opposite ends of the elastic sheet extend from the inner side surface of the locking lever.

9. The housing assembly according to claim 8, wherein:

two sides of the elastic sheet adjacent to the two opposite ends are separated from the inner side surface of the locking lever; and the boss is arranged in a middle portion of the elastic sheet between the two opposite ends of the elastic sheet in a direction of extension of the elastic sheet between the two opposite ends.

10. The housing assembly according to claim 5, wherein a wall surface of the groove near the sliding groove is formed with a chamfer.

11. The housing assembly according to claim 10, wherein the boss defines an inclined face that matches the chamfer.

12. The housing assembly according to claim 10, wherein a wall surface of the sliding groove proximate the groove is formed with a chamfer.

13. The housing assembly according to claim 4, wherein the locking lever further comprises:

a pair of arm portions; and a connecting portion connected to the pair of arm portions.

14. The housing assembly according to claim 13, wherein the pair of arm portions are pivotally connected to the opposite outer side surfaces of the housing body.

15. The housing assembly according to claim 14, wherein the elastic protrusion is formed on an inner side surface of each arm portion of the pair of arm portions.

16. The housing assembly according to claim 15, wherein the groove and the sliding groove are correspondingly formed in each outer side surface of the opposite outer side surfaces of the housing body.

17. An electrical connector housing, comprising:

a housing, including:

at least one groove formed in a first outer side surface of the housing and adapted to receive an elastic protrusion of a locking lever pivotally mounted to the housing with the locking lever in a pre-locked position; and at least one sliding groove formed in the first outer side surface of the housing and positioned adjacent to the at least one groove, the first sliding groove extending in a direction of extension between a first end and a second end opposite the first end, and adapted to slidably receive the elastic protrusion of the locking lever as the locking lever is moved from the pre-locked position toward a locked position, the second end of the sliding groove being open such that elastic protrusion is adapted to exit the sliding groove as the locking lever moves into the locked position, wherein the at least one groove is located directly adjacent to the first end of the at least one sliding groove in the direction of extension of the at least one sliding groove.

18. The housing according to claim 17, wherein:

the at least one groove includes a first groove formed in the first outer side surface of the housing and a second groove formed in a second outer side surface of the housing oppose the first outer side surface; and the at least one sliding groove includes a first sliding groove formed in the first outer side surface of the housing and a second sliding groove formed in the second outer side surface of the housing.

19. A housing assembly for an electrical connector, comprising:

a housing body including a groove formed in an outer side surface thereof, and a sliding groove formed in the outer side surface of the housing body, the sliding groove elongated in an arcuate direction of extension between a first end and a second end, and located adjacent to the groove in the direction of extension of the sliding groove; and a locking lever pivotally connected to the housing body and pivotable relative to the housing body between a pre-locked position and a locked position, the locking lever including an elastic protrusion formed on an inner side surface thereof, the groove and the elastic protrusion are adapted such that the elastic protrusion is engaged into the groove when the locking lever is in the pre-locked position, and the elastic protrusion is disengaged from the groove when the locking lever is moved from the pre-locked position, the sliding groove adapted such that as the locking lever is pivoted from the pre-locked position toward the locked position, the elastic protrusion disengaged from the groove enters into and is moved along the arcuate direction of the sliding groove until reaching the locked position wherein the elastic protrusion arranged outside of the sliding groove.

20. The housing assembly according to claim 19, wherein the locking lever further comprises an error-proofing stopper abutting a rearward-facing portion of the housing body in the pre-locked position and preventing the locking lever from being pivoted from the pre-locked position in a direction opposite to the locked position.

* * * * *